United States Patent [19]

Behmel

[11] 4,048,252
[45] Sept. 13, 1977

[54] COATING COMPOSITIONS AND PROCESS THEREFOR

[75] Inventor: Klaus Behmel, Graz, Austria

[73] Assignee: Vianova-Kunstharz, A.G., Vienna, Austria

[21] Appl. No.: 574,447

[22] Filed: May 5, 1975

Related U.S. Application Data

[63] Continuation-in-part of Ser. No. 298,388, Oct. 17, 1972, Pat. No. 3,882,188.

[30] Foreign Application Priority Data

Oct. 29, 1971 Austria .................................. 9369/71
Mar. 22, 1972 Austria .................................. 2430/72
Mar. 10, 1972 Austria .................................. 1995/72

[51] Int. Cl.² .................... C08G 63/06; C08L 77/00
[52] U.S. Cl. .......................... 260/850; 204/181; 260/21; 260/29.4 R; 260/75 N
[58] Field of Search .................... 260/850, 75 N, 72 R

[56] References Cited

U.S. PATENT DOCUMENTS

| | | | |
|---|---|---|---|
| 2,850,476 | 9/1958 | Seeger et al. | 260/850 |
| 3,310,512 | 3/1967 | Curtice | 260/850 |
| 3,366,591 | 1/1968 | Marshall et al. | 260/75 N |
| 3,438,943 | 4/1969 | Miranda et al. | 260/75 N |
| 3,476,697 | 11/1969 | Clements | 260/850 |

Primary Examiner—John C. Bleutge
Attorney, Agent, or Firm—A. W. Breiner

[57] ABSTRACT

An improved process and thermosetting coating compositions therefrom based on oil-free alkyds are described. Linear or pre-condensed polyesters carrying only terminal carboxyl groups which are the reaction product of n mols of hydroxy compounds with two free or latent hydroxyl groups and n + 1 mols of a dicarboxylic acid which will not form an anhydride are formed and then reacted with amine alcohols having the formula $$HO-(CX_2)_n-NH_2$$

wherein $n$ is 2 or 3, and X is equal or different and is standing for hydrogen, alkyl, aryl, or hydroxy-alkyl. The reaction product is combined with 10 to 60 percent of an aminoplast resin. The coating compositions provide films with outstanding flexibility and hardness and which are highly resistant to solvent and weathering conditions. The coating compositions are soluble in conventional organic coating solvents and can be rendered water soluble.

34 Claims, No Drawings

COATING COMPOSITIONS AND PROCESS THEREFOR

This is a division of application Ser. No. 298,388 filed Oct. 17, 1972 now U.S. Pat. No. 3,882,188.

FIELD OF INVENTION AND BACKGROUND

This invention is concerned with a process for producing thermosetting coating compositions of oil-free alkyd resins in combination with aminoplast resins, which can optionally be rendered water soluble through reaction with acids.

Oil-free alkyd resins, and more particularly saturated polyester resins, are excellent binders for coating compositions which combine superior hardness with outstanding flexibility and which are particularly resistant to solvents and weathering conditions. A combination of hardness and flexibility are the exigencies for paints applied by the coil coating process.

The known oil-free alkyds are linear or branched polyesters of diols and triols and/or tetrols, the hydroxy groups of which are terminal or distributed randomly in the polymer chain and which are combined with aminoplast resins as cross-linking agents. These polyesters in many cases have the disadvantage that they require very high stoving temperatures in order to attain the optimum properties. A reduction of the stoving temperatures can only be effected within a limited range by using acid catalysts which, however, usually cause a reduction in overall quality. A further disadvantage of these polyesters is their poor compatibility with butylated aminoplast resins, requiring judicious selection of special grades of materials to permit their use in combination. Another disadvantage is the poor dilutability of the resin blends with aromatic hydrocarbon solvents, unless greater amounts of alcohols, esters, and ketones are co-employed.

OBJECTS AND GENERAL DESCRIPTION

The primary object of the present invention is to provide coating compositions based on oil-free alkyd resins and aminoplast resins which do not have the disadvantages of prior art systems.

It is another object of the present invention to provide a controlled process of manufacturing coating compositions based on oil-free alkyd resins and aminoplast resins which are soluble in conventional organic coating solvents.

It is still another object of the present invention to provide a process and coating compositions based on oil-free alkyd resins and aminoplast resins which can be rendered water soluble.

It is another object of this invention to provide a process and improved coating compositions based on linear or pre-condensed polyesters and amino alcohols which are fully compatible with aminoplast resins.

These and other objects of the present invention will become more readily apparent from the following detailed description, with particular emphasis being placed on the illustrative examples.

The objects of the present invention are accomplished by the production of thermosetting coating compositions, optionally rendered soluble in water, from reaction products of linear or pre-condensed polyesters carrying only terminal carboxy groups, and with amine alcohols of the general formula $HO—(CX_2)_n—NH_2$, n being 2 or 3 with X being equal or different and standing for hydrogen, an alkyl, aryl or hydroxy-alkyl radical. The obtained reaction products are combined with aminoplast resins and can optionally be rendered water soluble through reaction with inorganic and organic acids in the presence of water tolerant solvents.

The reaction mechanism and resin structure when using linear polyesters and amine alcohols of the general formula

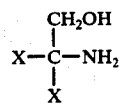

can be illustrated by the following:

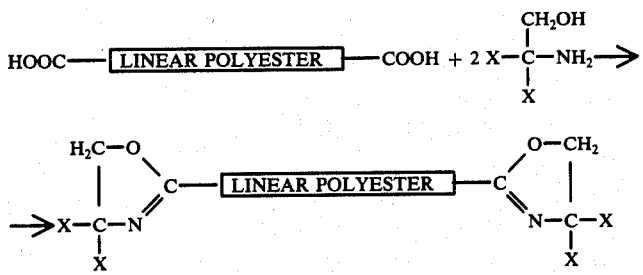

A unique advantage of the invention is realized when X is a hydroxy-alkyl radical. Accordingly, two highly reactive hydroxy groups are available on each end chain for reaction with the aminoplast resins. Further reactive hydroxy groups can be introduced in a favorable position through the reaction of aldehydes with the C-atom in the α-position to the oxazoline ring. This feature can be used to introduce OH-groups for cross-linking with the aminoplast resins, if amine alcohols are used in which X is not a hydroxy-alkyl radical.

Other resin combinations with excellent coating properties are obtained in accordance with this invention if linear polyesters with terminal carboxyl groups are pre-condensed in situ or subsequently with hydroxy compounds carrying more than 2 hydroxy groups, to an extent such that the solubility stage of the system is not surpassed. Instead of the structure noted above, the polyester will have the following structure:

wherein R is the moiety of a hydroxy compound with more than 2, and preferably 3 hydroxy groups remaining after the esterification with one hydroxyl group of the hydroxy compound to form the polyester. Through this precondensation, higher molecular weight polyesters of the same basic structure are formed, which can then be reacted with the amine alcohols as before. After reaction with the amine alcohols, the structure of the resultant polyesters can be illustrated as follows:

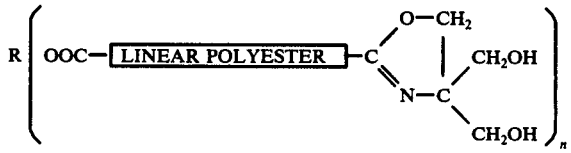

The products obtained after combination with the aminoplast resin, although having a reduced hydroxyl number, show even better surface hardness than the products of the linear polyesters of the same cross-linking density. Also the solubility characteristics of various combinations are enhanced through the precondensation.

The use of amine alcohols in polyester resins is not alleged to be novel. Their use is known from U.S. Pat. No. 3,366,591 which describes thixotropic polyester resins. An amine alcohol, such as 2-amino-2-methylol1,3-propanediol, is introduced in random distribution, precluding the obtaining of products having the advantages of the products of the present invention. French Pat. No. 1,353,755 also describes polyester resins using tris(hydroxymethyl)amino-methane. In this case the amino alcohol is present from the beginning of the reaction and leads to polyesters carrying hydroxy groups in random distribution. The products are very dark in color and, accordingly, they have only limited application, i.e., for electrical insulating varnishes. U.S. Pat. No. 3,203,935 and No. 3,208,981 describe copolymers of acrylic acid and tris(hydroxymethyl)amino-methane which are stoved together with aminoplast resins. The hydroxy groups are again present in random distribution, precluding the obtaining of products having the advantages of the products of the present invention.

Contrary to the prior art noted above, the present invention is concerned with a process for producing, and the resultant thermosetting resins or coating compositions based on the combinations of oil-free alkyds with aminoplast resins, which are characterized in that A. $n$ mols of one or more hydroxy compounds with 2 free or latent hydroxy groups are reacted with B. $n + 1$ mols of a dicarboxylic acid which will not form an anhydride to form a linear, carboxy terminated polyester AB, C. each 1 mol of polyester AB is then reacted with a maximum of 2 mols of an amine alcohol of the general formula

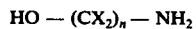

$n$ being 2 or 3, and X being equal or different and standing for hydrogen, an alkyl, aryl or hydroxyalkyl radical, the reaction product ABC being optionally reacted with a maximum of 2 mols per mole of amine alcohol, or an aldehyde, and D. the ABC reaction product combined with 10 – $\alpha$percent of an aminoplast resin.

The process is further characterized in that the polyester AB, prior to reaction with C, is pre-condensed either in situ or subsequently with hydroxy compounds carrying more than 2, preferably 3 hydroxy groups to form a reaction product with an intrinsic viscosity of 20 ml./g. (measured in chloroform at 20° C.) as a maximum.

The polyester resins of the composition used according to the present invention normally are insoluble in the solvents used in the paint and varnish industry. In some cases, however, there exists limited solubility. Surprisingly, through combination of the polyesters with aminoplast resins they become readily soluble in such solvents. In some instances mixing at room temperature is sufficient, while in other cases solubility is only achieved by heating the blends. Due to their constitution, the coating compositions of the invention exhibit excellent compatibility with aminoplast resins, also with those of medium and low reactivity. For the preparation of water soluble end products, water soluble aminoplast resins are preferred.

In order to obtain solubility of the coating compositions, reaction products ABCD are combined with acids in amounts to reach a pH-value of between 1 – 8, preferably 2 – 6, measured on an aqueous solution with 10 percent resin solids content. Suitable organic acids are low molecular mono- or polycarboxylic acids, oxycarboxylic acids, hydroxy carboxylic acids, particularly hydrophilic or water soluble acids, e.g., formic acid, acetic acid, oxalic acid, malonic acid, citric acid, and preferably lactic acid. Suitable inorganic acids are, for example, hydrochloric acid, sulphuric acid, per-chloric acid, phosphoric acid, water soluble derivatives of these acids, and preferably phosphoric acid. If the final products are not intended for application by electrodeposition, volatile acids are preferred to achieve solubility in water. Generally, any organic or inorganic acid can be employed which is compatible with the resin system and which will lower the pH-value of the system without detrimentally affecting the coating properties of the system.

The products of the invention are excellent binding media for stoving paints and enamels, and can be applied by usual coating methods. In their water soluble form they can also be applied by cathodic electrodeposition. The cured films exhibit outstanding flexibility in combination with superior hardness and excellent adhesion to metal, which permits extreme post-forming of the coated flat metal stock. The extreme resistance of the cured films to solvents is particularly noteworthy. Such solvents include the aromatic and aliphatic hydrocarbons, ketones, alcohols, esters, etc. Moreover, the cured films are highly resistant to various other chemicals and to salt spray, etc. The stoving temperatures necessary to attain the optimum paint performance can be reduced by 20° – 30° C., over stoving temperatures required for comparable products using equal stoving times of from 15 – 30 minutes. The stoving temperatures are generally in the range of from 100° and 130° C. Contrary to all expectations, the coating compositions of the invention have excellent storage stability in the presence of usual acid catalysts such as p-toluol sulfonic acid. It is theorized that the stabilization is due to the formation of salts with the catalyst, which render the catalyst active only at temperatures of around 100° C. This stability is particularly desirable since it permits the formation of pre-catalyzed intermediates. Also water soluble end products require the addition of catalysts. For cathodic electrodeposition those catalysts are preferred which are partly or wholly precipitated at the cathode on account of their poor solubility in water. Examples are sulfonic acids, e.g., p-toluol sulfonic acid, 2-ethylaminotoluolsulfonic acid-(4), alkylphenol esters of phosphoric acid, etc. Moreover, the coating compositions have excellent pigment wetting capacity as well as excellent compatibility with a great number of other binding media. In the formulation of paints, the pigments normally used in the paint industry can be used, including metallic pigments, basic pigments, fillers, paint additives, etc. The viscosity of the resin solutions is relatively low, also with high solids content, permitting the formulation of high solids content paints.

Suitable as component A, i.e., the hydroxyl compounds, are those compounds which carry substantially two free or latent hydroxy groups, such as ethylene glycol; propanediol-1,2; propanediol-1,3; 2,2-dimethylpropanediol-1,3; butanediol-1,2; butanediol-1,3; butanediol-1,4; 2,2-dimethylpentanediol-1,3; hexanediol-1,6; trimethylhexanediol-1,6; alkylene oxides; cyclohexanediol-1,4; 1,4-bis(-hydroxymethyl)-cyclohexane; hydrated bisphenol A; diethylene glycol; triethylene glycol; di- and tripropylene glycol; bis(hydroxyalkyl)-ethers of diphenols, e.g., of bisphenol A, partly saponifiable glycidylesters of saturated fatty acids, partly saponifiable monoesters of triols and diesters of tetrols, compounds carrying ester groups, such as 2,2-dimethyl-3-hydroxypropyl-2,2-dimethyl-3-hydroxypropionate, and the like. Generally, the hydroxyl containing component can be any aliphatic, including cyclic and substituted aliphatic, or aryl, including substituted aryl compounds carrying two free or latent (reactive) hydroxyl groups which will react with a dicarboxylic acid to form a polyester.

Compounds suitable as component B are dicarboxylic acids which do not form anhydrides, such as isophthalic acid, terephthalic acid, fumaric acid, hexahydroisophthalic acid, hexahydroterephthalic acid, succinic acid, glutaric acid, adipic acid, trimethyladipic acid, substantially saturated dimeric fatty acids, as well as the esters of these acids, such as dimethylterephthalate. Generally, the dicarboxylic acid can be any aliphatic including substituted aliphatic, or aryl, including substituted aryl, compounds which will not form an anhydride having two carboxyl groups which are reactive with a hydroxyl compound to form a polyester.

Optionally, hydroxy carboxylic acids, such as lactic acid, or lactones, such as ω-caprolactone, can be co-employed. In order to obtain special properties, polycarbonate units can be incorporated according to known methods. Suitable hydroxy compounds carrying three or more free hydroxy groups which can be co-employed, if desired, include the trimethylol alkanes, such as trimethylolethane, trimethylol propane, glycerol, hexane triol, trimethylolcyclohexane, pentaerythritol. Hydroxy compounds with three equal hydroxy groups are preferred. In addition, esterification products having an average hydroxy functionality of more than 2 have also proved useful, such as low molecular weight polyesters, dehydrated castor oil, etc.

Suitable amino alcohols falling within the general formula noted above are 2-amino-2-hydroxymethylpropanediol-1,3; 2-amino-2-ethylpropanediol-1,3; 2-amino-2-methylpropanediol-1,3; 2-aminoethanol; 2-amino-2-methylbutanediol-1,4; 2-amino-2-phenylpropanediol-1,3; 1-methyl-2-amino-2-hydroxymethylpropanediol-1,3; and 1-phenyl-2-amino-2-hydroxymethylpropanediol-1,3. Generally, amine alcohols having alkyl or substituted alkyl groups will have no more than about 18 carbon atoms in a carbon-to-carbon chain, and preferably no more than about 7. If other functional groups are present, they must not interfere with the —OH or —NH$_2$ groups. Amine alcohols when carrying aryl substituents are preferably phenyl or substituted phenyl, but can include compatible di- and tri- ringed components including fused and non-fused ring compounds. The essential feature is compatible along with the presence of the —OH and —NH$_2$ groups. Suitable aldehydes which may be employed are formaldehyde, acetaldehyde, propionealdehyde, butyraldehyde, etc.

Suitable aminoplast resins are the aldehyde condensates of aminotriazines, aminodiazines, ureas, the methylol groups of which are completely or partially etherified with lower alkyl alcohols such as methanol, ethanol, or butanol. The aldehyde can be any of the commercially available aldehydes such as formaldehyde, acetaldehyde, as well as other aliphatic aldehydes having up to about 12 carbon atoms in a carbon-to-carbon chain and aryl, including substituted aryl. Preferably formaldehyde, phenyl, and furyl aldehyde are used due to availability, cost, etc. The selection of adequate resins is made in known manner according to the desired film properties.

The coating compositions of the invention are prepared as follows:

1. Polyesters

The preparation of the linear polyester from components A and B is carried out according to known methods. The acid value of the polyester is a function of the chosen molar proportions of A and B. The acid value has a simple relation to $\overline{M}$ of the polyester carrying terminal carboxy groups:

$\overline{M} = (11.2 \times 10^3)/\text{acid value}$

The molar proportions are chosen according to the desired properties such that the higher the value of $\overline{M}$ the more flexible the products obtained, or the lower the value of $\overline{M}$ the more rigid the products obtained.

The pre-condensation of the linear polyester, in principle, can be carried out such that either a. a linear polyester with a constant acid value is produced through esterification of diols with dicarboxylic acids, and the linear polyester pre-condensed through esterification with hydroxy compounds carrying more than 2 hydroxy groups, or b. the pre-condensed polyester is produced in situ through either simultaneous reaction of all starting materials or in a sequence adjusted to the raw materials.

It has been found that, probably on account of re-esterification reactions, with either method, products with practically identical properties are obtained.

The average molecular weight of the linear polyester chains contained in the pre-condensed linear polyester is obtained according to -

$$\overline{M}_{lin} = \frac{A_t}{n_s + n_D - e_D} = \frac{A_t}{n_s - n_D}$$

$A_t$ = thousand yield = weigh-out minus reaction water,
$n_D$ = number of (applied) mols diol,
$n_s$ = number of mols dicarboxylic acid, and
$e_D$ = number of hydroxyl equivalents used as diols.

The acid value is calculated according to $$AV = \frac{e_s - e_p}{A_t} \times 5.6 \times 10^3$$

$e_p$ = number of hydroxy equivalents of the polyol, and $e_s$ = number of the carboxy equivalents.

The reaction is controlled with the aid of determinations of the acid values. The reaction is carried on until the acid value remains practically constant.

2. Reaction of the polyester with the amine alcohol

The amount of amine alcohol A, required to obtain the oxazoline compound, is calculated according to the formula:

$$A = (e_s - e_p) \times M_A$$

$M_1$ = molecular weight of the amine alcohol.

The reaction is carried out at 150°– 200° C., preferably using entraining agents to eliminate the water. The progress of the reaction is controlled from determinations of the acid value. Acid values of below 1 mg.KOH/g. are preferred. The obtained products are insoluble or only partially soluble in normally used solvents, e.g., aliphatic and aromatic hydrocarbons, alcohols, and esters.

The optional reaction with aldehydes is carried out at 100° – 150° C., to the point at which the content of free aldehyde has fallen to practically zero. When using paraformaldehyde, this value is normally obtained after a reaction of 2 hours at 130° C.

3. Combination of polyester/amine alcohol resin with aminoplast resin

Combination with the aminoplast resin is preferably carried out in the presence of solvents, with through mixing at the temperature necessary for homogenizing the components. In case the products are incompatible, the blend is kept at elevated temperature, e.g., reflux temperature, optionally in the presence of acid catalysts, e.g., p-toluol sulfonic acid (in amounts of from 0.01 to 1 percent of resin solids), until a sample remains clear after the solvent has evaporated. Homogenizing at elevated temperature in many cases is favorable for the properties of the film. This is particularly advantageous for products which are intended as binding media for cathodic electrodeposition. A portion of the polyester is reacted with the aminoplast resin, preferably using such linear polyesters which carry only one hydroxy group at the oxazoline ring. Preferably, only one methylol group of the aminoplast resin is reetherified. The resulting reaction product is reacted with further linear polyester or pre-condensed polyester.

The obtained solutions can be diluted with normal solvents, such as aromatic hydrocarbons, alcohols, esters, and ketones or blends thereof, optionally in the presence of minor amounts of aliphatic hydrocarbons. If the paints are to be thinned with water, suitable water tolerant solvents are used, e.g., alcohols, ethers, glycol ethers, esters, ketones, and preferably glycol semi-ethers. Some of the saturated polyesters themselves are not soluble in these solvents. In such cases the aminoplast resin serves as the bridging medium, eventually upon addition of a proportion of the acid used to obtain the solubility in water. A portion or the complete quantity of the acid can be added prior to combination with the aminoplast resin.

The following examples illustrate the invention without limiting the scope of it. In these examples, Examples 1 to 7 and the comparative Examples A and B are concerned with the preparation of linear polyesters and their reaction and an amine alcohol and an aminoplast resin. The properties of these products as binding media are compared in Table I. Examples 8 to 15 illustrate the production of coating compositions using pre-condensed linear polyesters. The performance of these compositions is compiled in Table II. Examples 16 to 23 are concerned with the water soluble coating compositions according to the present invention. Parts are by weight if not indicated to be otherwise.

EXAMPLE 1

200 g. isophthalic acid and 290 g. trimethylhexanediol-1,6 are esterified at 220° C. to an acid value of 8 mg.KOH/g., using xylol as entraining agent. 176 g. adipic acid are added and the esterification is carried on to a constant acid value. The final value of the acid number is 110 mg.KOH/g. Then 143 g. 2-amino-2-hydroxymethylpropanediol-1,3 are added and the reaction is continued at 180° C. until an acid value of 0.3 mg.KOH/g. is reached. The resulting product has a pasty consistency after cooling. It is insoluble in xylol, butanol, ethylene glycol monoethylether, ethylene glycol monoethyletheracetate and acetone.

704 g. of the above reaction product are blended with 470 g. ethylene glycol monoethylether/ and 920 g. of an available 60 percent solution of a highly reactive butanol-etherified melamine formaldehyde resin (Viamin® M 4, Vianova Kunstharz, A.G.) and are held at reflux temperature for 3 hours. The obtained solution is infinitely dilutable with esters, ketones, glycol ethers and suitable mixtures of aromatic hydrocarbons with alcohols, such as xylol/butanol (1:1) and partially dilutable with aromatic hydrocarbons and alcohols.

EXAMPLE 2

A polyester is produced according to known methods from 255 g. of symmetrical bis-(2-hydroxypropyl)-ether of Bisphenol A, 290 g. adipic acid, 119 g. trimethylhexanediol-1,6. The polyester is reacted with 123 g. 2-amino-2-hydroxymethylpropanediol-1,3, at 175° C. until an acid value of 0.6 mg.KOH/g. is reached. The reaction product is diluted with 470 g. ethylene glycol monoethylether and homogenized at 60° C. with 680 g. of the melamine resin used in Example 1.

EXAMPLE 3

A polyester is produced analogous to Example 1 from 203 g. isophthalic acid, 336 g. neopentyl glycol, and 263 g. adipic acid. The acid value is 0.4 mg.KOH/g. After reaction with 95 g. 2-amino-2-hydroxymethylpropanediol-1,3, as in Example 1; the batch is diluted with 475 g. ethylene glycol monoethylether. Analogous to Example 1, a homogeneous resin solution is prepared at 100° C. with 510 g. melamine formaldehyde resin, 60 percent non-volatile in butanol.

EXAMPLE 4

220 g. symmetrical bis-(2-hydroxypropyl)-ether of 4-4'-diphenylolpropane, 250 g. adipic acid, and 68 g. neopentyl glycol are reacted at 190° C. using xylol as entraining agent to form a polyester resin with an acid value of 108 mg.KOH/g. The polyester is reacted at 180° C. with 115 g. 2-amino-2-hydroxymethyl-propanediol-1,3, diluted with 380 g. ethylene glycol monoethylether and combined with 410 g. melamine-formaldehyde-resin, 60 percent non-volatile, analogous to the procedure of Example 1.

EXAMPLE 5

A polyester is produced from 196 g. symmetrical bis-(2-hydroxypropyl)-ether of 4,4'-diphenylolpropane, 48 g. neopentyl glycol, and 200 g. adipic acid. The acid value of the polyester is 88 mg.KOH/g. The polyester is reacted with 78 g. 2-amino-2-ethylpropanediol-1,3 at 170° C. After dilution with 308 g. ethylene glycol monoethylether, the reaction product is combined according to Example 1 with 450 g. of Viamin® M 2 melamine resin having medium reactivity (60 percent non-volatile).

EXAMPLE 6

2.36 g. symmetrical bis-(2-hydroxypropyl)-ether of 4,4'-diphenylolpropane, 200 g. adipic acid, and 40 g. neopentylglycol are esterified at 200° C. to a constant acid value, using xylol as entraining agent. The polyester has an acid value of 89 mg.KOH/g. 43 g. monoethanol amine are added and the reaction is carried on at 180° C. until an acid value of below 1 mg.KOH/g. is reached. Then 42 g. paraformaldehyde (91 percent) are added and the mass is held at 120° - 130° C. for 2 hours, without distillation. Then 330 g. ethylene glycol monoethylether and 354 g. of the melamine resin used in Example 1 are added. The batch is kept at reflux temperature for 3 hours.

EXAMPLE 7

A polyester from 196 g. of symmetrical bis-(2-hydroxypropyl)-ether of 4,4'-diphenylol propane, 200 g. adipic acid and 64 g. neopentyl glycol (acid value 73 mg.KOH/g.) is reacted with 62 g. 2-amino-2-ethyl-propanediol-1,3 to an acid value of below 0.5 mg.KOH/g. After addition of 22 g. paraformaldehyde (91 percent) the batch is reacted at 120° - 130° C. Then 322 g. ethylene glycol monoethylether, 605 g. of the melamine-formaldehdye resin of Example 5 and 0.7 g. p-toluol sulfonic acid are added. The mass is held at reflux temperature for 3 hours.

COMPARATIVE EXAMPLE A

A linear polyester is prepared according to Deutsche Offenlegungsschrift 1,805,199, from propanediol-1,2,diethylene glycol, phathalic anhydride and adipic acid in a mol ratio of 5:3:6:1. The polyester is mixed with the melamine formaldehyde resin used in Example 1, in a ratio of 75:25 (solids/solids). As curing catalyst, 1 percent of p-tolul sulfonic acid is used.

COMPARATIVE EXAMPLE B

A commercially available oil-free alkyd resin, 60 percent, in xylol, acid value 5 - 15 mg.KOH/g., viscosity 10 - 15 P. (20° C.), recommended for combination with butylated melamine resins, is mixed in a solids ratio of 80:20 with the melamine-formaldehyde resin of Example 1. The producer of the polyester resin recommends a stoving schedule of 30 minutes/130° - 150° C. An analysis showed no nitrogen in the polyester resin.

EXAMPLE 8

28 g. neopentylglycol, 240 g. of symmetrical bis-(2-hydroxy-propyl)-ether of 4,4'-diphenylolpropane and 308 g. adipic acid are esterified at 190° C. to a constant acid value of 198 mg.KOH/g. using xylol as entraining agent. Through addition of trimethylol propane in 10 - 5 g. increments, and esterification to a constant acid value, the product is then pre-condensed. After addition of a total of 46 g. trimethylol propane, a polyester with an acid value of 121 mg.KOH/g. and an intrinsic viscosity of 9.5 ml./g. (measured in chloroform at 20° C.) is obtained. The polyester is then reacted at 180° C. with 147 g. 2-amino-2-ethylpropanediol-1,3, until an acid value of 0.9 mg.KOH/g. is obtained. 42 g. paraformaldehyde (91 percent) are added and the batch is kept at 120° - 130° C. without distillation for 2 hours. The reaction product is dissolved in ethylene glycol monoethylether and a clear, stable solution is obtained. For the preparation of a paint, 80 parts of the solution are cold blended with 20 parts of a solution of an aminoplast resin with medium reactivity (Viamin® M 2 of Vianova Kunstharz, A. G.).

EXAMPLE 9

The polyols and dicarboxylic acids used in Example 8 are esterified simultaneously to a constant acid value. The end product has practically the same characteristic data as the product of Example 8. Then the process of Example 8 is continued.

EXAMPLE 10

270 g. dimethylterephthalate, 190 g. propylene glycol, and 35 g. trimethylol propane are re-esterified in the presence of 0.05 g. zinc (as octoate). When the re-esterification reaction is finished, 288 g. adipic acid are added and the batch is esterified to a constant acid value. The polyester has an acid value of 76 mg.KOH/g. and an intrinsic viscosity of 11.2 ml./g. (measured in chloroform at 20° C.). Then 93 g. 2-amino-2-hydroxymethylpropanediol-1,3 are added and the reaction is carried out at a maximum of 180° C. to an acid value of 0.8 mg.KOH/g., 618 g. of the obtained product are diluted with 412 g. of a 1:1 blend of ethyl glycol and ethyl glycol acetate, and homogenized at elevated temperature with 478 g. of a 60 percent solution of a highly reactive melamine resin (Viamin® M 4, Vianova Kunstharz, A. G.).

EXAMPLE 11

A polyester with an acid value of 61 mg.KOH/g. and an intrinsic viscosity of 12.1 mg./g. (measured in chloroform at 20° C.) is prepared according to the process of Example 10 from 238 g. dimethylterephthalate, 220 g. propylene glycol, and 31 g. trimethylol propane. The polyester is reacted at 180° C. with 79 g. 2-amino-2-hydroxymethylpropanediol-1,3, until an acid value of 0.7 mg.KOH/g. is obtained. The reaction product is diluted with 443 g. of a 1:1 blend of ethylene glycol monoethylether and ethylene glycol monoethylether acetate and cold blended with 761 g. of the aminoplast resin used in Example 10.

EXAMPLE 12

A polyester prepared according to Example 11 is reacted with 41 g. monoethanol amine to an acid value of 0.6 mg.KOH/g. Then 45 g. paraformaldehyde (91 percent) are added and the batch is kept at 120° - 130° C. for 2 hours. The product is diluted to a solids content of 60 percent with ethylene glycol monoethylether. A clear solution is obtained. In preparing a paint the solution is mixed in a ratio of 70:30 with the melamine resin solution used in Example 10.

EXAMPLE 13

A polyester is prepared according to Example 10 from 140 g. dimethylterephthalate, 116 g. propylene glycol, 160 g. castor oil, and 154 g. adipic acid. The acid value is 74 mg.KOH/g., and the intrinsic viscosity is 11.5 ml./g., measured in chloroform at 20° C. Through reaction with 79 g. of 2-amino-2-hydroxymethylpropanediol-1,3, a product with an acid value of 0.7 mg.KOH/g. is obtained. After dilution with ethylene glycol monoethylether to a solids content of 60 percent, the still hot solution is combined in a ratio of 75:25 with the aminoplast resin used in Example 10 and the blend is held at reflux temperature for 1 hour.

EXAMPLE 14

88 g. dimethylterephthalate are re-esterfied with 123g. propylene glycol in the presence of 0.02 g. zinc (as octoate). 80 g. isophthalic acid, 200 g. castor oil, and 193 g. adipic acid are added and the esterification is carried to a constant acid value. The product has an acid value of 116 mg.KOH/g. and an intrinsic viscosity of 9.5 ml./g. (measured in chloroform at 20° C.). The polyester is reacted with 151 g. 2-amino-2-hydroxymethyl-propanediol-1,3 to an acid value of 0.6 mg.KOH/g. and diluted with ethylene glycol monoethylether to a solids content of 60 percent. The still hot solution is combined with the aminoplast resin used in Example 10 in a ratio of 70:30 and held at reflux temperature for 3 hours.

EXAMPLE 15

198 g. dimethylterephthalate are re-esterified with 168 g. propylene glycol in the presence of 0.04 g. zinc (as octoate) and esterified with 174 g. adipic acid to a constant acid value. 422 g. of a linear polyester with an acid value of 80 mg.KOH/g. are obtained. In another reaction vessel, 140 g. trimethylol propane and 94 g. dimethylterephthalate are esterified at a temperature of up to 240° C. in the presence of 0.03 g. zinc (as octoate). A product carrying 4 hydroxy groups per mol on an average is obtained. 40 g. of this hydroxy compound are used to pre-condense the linear polyester. Through esterification at 190° C. to a constant acid value, a resin with an acid value of 73 mg.KOH/g. and an intrinsic viscosity of 11.6 ml./g. is obtained. The further processing is carried out analogous to Example 10.

EXAMPLE 16

175 g. of the symmetrical bis-(2-hydroxypropyl)-ether of 4,4'-diphenylol propane are esterified with 125 g. Cardura® E (Shell, glycidyl ester of a carboxylic acid with an acid value of 300 mg.KOH/g. and with 90 percent of the carboxy groups attached to a tertiary carbon atom) and 250 g. adipic acid to a constant acid value of 121 mg.KOH/g., using xylol as entraining agent. 144 g. 2-amino-2-hydroxymethylpropanediol-1,3 are added and the esterification is carried to an acid value of 0.9 mg.KOH/g. The product is dissolved in ethylene glycol to a solids content of 60 percent. The obtained solution becomes turbid when cooled.

60 g. of this solution are mixed at elevated temperature with 113 g. lactic acid (70 percent). A clear solution is obtained which remains stable also after cooling.

17 g. hexamethoxymethylmelamine are added. The solution can be diluted with water to a solids content of 10 percent without precipitation of the resin. To another sample, p-toluol sulfonic acid (1 percent of resin solids) is added, the solids content is reduced with water to 30 percent, a wetting agent (silicone resin, soluble in water and organic solvents, 0.1 percent of resin solids, Tegopren of Goldschmidt AG. Essen) is added and the varnish is sprayed onto mild steel panels. Upon stoving (30 minutes at 160° C.) a hard deep gloss film is obtained.

EXAMPLE 17

385 g. dimethylterephthalate are re-esterified with 363 g. propylene glycol in the presence of 0.1 g. zinc (as naphthenate). 423 g. adipic acid and 358 g. of a saturated dimeric fatty acid (Emery 3020, Unilever, color-stabilized dimeric fatty acid, iodine number 25 – 35, consisting of 3 percent monomeric 75 percent dimeric, and 22 percent trimeric fatty acids) are added and the batch is esterified to a constant acid value of 110 mg.KOH/g. 306 g. 2-amino-2-hydroxymethylpropanediol-1,3 are added and the reaction is carried on at 180° C., until an acid value of 0.8 mg.KOH/g. is obtained, using xylol as entraining agent for the water. The obtained product is dissolved with butyl glycol to a solids content of 60 percent. 60 g. of the still hot solution are mixed with 12 g. formic acid (80 percent). The obtained solution is clear and stable after cooling, and can be diluted with water to a solids content of 10 percent. 17 g. hexamethoxymethylmelamine are added, the solution is diluted to 60 percent solids content with butyl glycol. After addition of the wetting agent used in Example 16 (0.1 percent of resin solids) and of p-toluol sulfonic acid (1 percent of resin solids), the solids content is reduced with water to about 30 percent. The solution is sprayed onto mild steel and stoved for 30 minutes at 150° C. A hard deep gloss film is obtained.

EXAMPLE 18

The process of Example 17 is varied by using 18 g. acetic acid (96 percent) instead of formic acid. The obtained results are equal to those of Example 17.

EXAMPLE 19

The process of Example 17 is varied using 12 g. lactic acid (70 percent) instead of formic acid in the preparation of the resin. The obtained product is clear and stable and can be diluted with water to a solids content of 10 percent.

From the concentrated resin solution a red and white paint are prepared (pigment: Molybdatrot, pigment-/binder = 0.4:1; $TiO_2$, Rutile type, pigment/binder = 0.8:1).

The paints are combined with a water dilutable aminoplast resin (hexamethoxymethylmelamine), a wetting agent (e.g., 0.1 percent Tegopren of resin solids), and p-toluol sulfonic acid (1percent of resin solids) are added and the solids content is adjusted to about 30 percent with a 9:1 blend of water and methylglycol. The paints are sprayed onto zinc-phosphated steel and stoved.

The following results are obtained:

| | Polyester: Aminoplast Resin | Stoving Schedule min/° C. | Hardness DIN 53157 | Pencil Hardness |
|---|---|---|---|---|
| red paint | 75 : 25 | 20 / 150 | 130 secs | 2H to 3 H |
| white paint | 85 : 15 | 30 / 150 | 81 secs | H to 2 H |

| Impact Direct | Reverse | Indentation DIN 53156 | Crosshatch DIN 53151 | Gloss | Xylol Swab |
|---|---|---|---|---|---|
| over 80 | over 50 | 4.2 | Gt 1-2 | over 100% | over 5 min. |
| over 80 | over 80 | 6.8 | Gt 0 | over 100% | over 5 min. |

EXAMPLE 20

A polyester prepared according to Example 17 is diluted to 60 percent solids with methylglycol. A clear stable solution is obtained. To 100 g. of the solution, 40 g. of a 60 percent solution of hexamethoxymethylmelamine in butyl glycol and 6 g. phosphoric acid (85 percent) are added and the blend is diluted with water. A solids content of 10 percent can be obtained without precipitation of the resin.

EXAMPLE 21

46 g. trimethylolpropane, 28 g. neopentylglycol, 240 g. of the symmetrical bis-(2-hydroxypropyl) ether of 4,4'-diphenylolpropane and 308 g. adipic acid are esterified to a constant acid number of 117 g.KOH/g. The product has an intrinsic viscosity of 9.5 ml./g. (measured in chloroform: ethylglycol 9:1 at 20° C.).

Upon reaction with 143 g. 2-amino-2-hydroxymethylpropanediol-1,3, a polyester with an acid value of 0.2 g.KOH/g. is obtained.

60 g. of the resin are mixed at elevated temperature with 40 g. butylglycol and 15 g. lactic acid (70 percent). After cooling, the solution is clear and stable. It can be diluted with water to a solids content of 10 percent without precipitation of the resin.

EXAMPLE 22

A polyester is prepared from 220 g. of the symmetrical bis-(2-hydroxypropyl)-ether of 4,4'-diphenylolpropne, 58 g. neopentyl glycol and 250 g. adipic acid through esterification to a constant acid value of 118 mg.KOH/g. The polyester is reacted with 125 g. 2-amino-2hydroxymethylpropanediol-1,3 to an acid value of 0.8 mg.KOH/g. (Product A). Similarly, a polyester reacted with 123 g. of 2-amino-2-ethyl propanediol-1,3 to an acid value of 0.7 mg.KOH/g. (Product B). The product is then reacted with 430 g. hexamethoxymethylmelamine, in the presence of 0.3 g. p-toluol sulfonic acid, at temperatures of up to 160° C. and with vacuum, until the amount of methanol distilling off is equivalent to the hydroxy groups of Product B (33 g.) (Product C).

20 g. of Product A, 40 g. of Product C, and 40 g. of butylglycol are mixed at slightly raised temperature and, after cooling, 6 g. phosphoric acid (85 percent) are added. After addition of p-toluol sulfonic acid (3 percent of resin solids), the solids content is reduced to 10 percent with water. The resin is electrodeposited cathodically at a current of 24 V on mild steel and is stoved for 30 minutes at 160° – 180° C. The obtained film is hard and has good gloss. Similar results are obtained on other substrates, e.g., copper, aluminum, and glavanized steel.

EXAMPLE 23

243 g. of Product B of Examples 22 are reacted at 120° – 130° C. for two hours with 12.5 g. paraformaldehyde. 42 g. of the reaction product are blended at slightly elevated temperature with 18 g. hexamethoxymethylmelamine, b 40 g. butyl glycol, and 6 g. phosphoric acid (85 percent). The blend can be diluted with water to a solids content of 10 percent without precipitation of the resin.

If the polyester is poorly soluble in chloroform, the intrinsic viscosity of the material of the examples is determined with the aid of small additions of ethyl glycol. Thereby the recorded intrinsic viscosity is practically not influenced.

TABLE I

| Examples | PBR | PG | Stoving Schedule min./° C. | Hardness DIN 53157 | Pencil Hardness | Impact D | Impact R | Indentation DIN 53156 | Crosshatch DIN 53151 | Gloss | Xylol Test |
| --- | --- | --- | --- | --- | --- | --- | --- | --- | --- | --- | --- |
| 1 | 0.8:1 | TiO$_2$ Rutile | 30/110 | 108 | 2H – 3H | >80 | 70 | 6.8 | Gt 1 | over 100 | over 8 |
| 2 | 0.8:1 | TiO$_2$ Rutile | 30/120 | 103 | H – 2H | >80 | 70 | 7.0 | Gt 0 | over 100 | over 8 |
| 3 | 0.8:1 | TiO$_2$ Rutile | 30/130 | 113 | 2H – 3H | >80 | >80 | 6.8 | Gt 1 | over 100 | over 8 |
| 4 | 0.1:1 | Phthalo-cyanine-blue | 30/110 | 135 | 3H – 4H | >80 | >80 | 7.3 | Gt 0 | over 100 | over 8 |
| 5 | 0.8:1 | TiO$_2$ Rutile | 30/110 | 105 | H – 2H | >80 | >80 | 7.3 | Gt 0 | over 100 | over 8 |
| 6 | 0.8:1 | TiO$_2$ Rutile | 30/120 | 130 | 3H – 4H | >80 | >80 | 6.9 | Gt 0 | over 100 | over 8 |
| 7 | 0.5:1 | Molyb-datrot | 30/120 | 111 | H – 2H | >80 | >80 | 7.0 | Gt 1 | over 100 | over 8 |
| A | 0.8:1 | TiO$_2$ Rutile | 30/120 | 53 | HB – H | 20 | 5 | 7.0 | Gt 0-1 | over 100 | over 8 |
| B | 0.8:1 | TiO$_2$ Rutile | 30/130 | 116 | H – 2H | 30 | 20 | 5.0 | Gt 2 | over 100 | over 8 |
| B | 0.8:1 | TiO$_2$ Rutile | 30/150 | 125 | 2H – 3H | 25 | 15 | 4.0 | Gt 3 | over 100 | over 8 | with an acid value of 118 mg.KOH/g. is prepared and is

TABLE II

| Examples | PBR | PG | Stoving Schedule min./° C. | Hardness DIN 53157 | Pencil Hardness | Impact D | Impact R | Indentation DIN 53156 | Crosshatch DIN 53151 | Gloss | Xylol Test |
| --- | --- | --- | --- | --- | --- | --- | --- | --- | --- | --- | --- |
| 8 | 1:1 | TiO$_2$ Rutile | 30/130 | 115 s | 5H – 6H | >80 | >80 | 8.0 | Gt 0-1 | over 100 | >5 min. |
| 9 | 1:1 | TiO$_2$ Rutile | 30/130 | 112 s | 5H – 6H | >80 | >80 | 8.1 | Gt 0-1 | over 100 | >5 min. |
| 10 | 0.8:1 | TiO$_2$ Rutile | 30/110 | 105 s | 3H – 4H | >80 | >80 | 8.7 | Gt 1-2 | over 100 | >5 min. |
| 11 | 0.8:1 | TiO$_2$ Rutile | 30/110 | 112 s | 5H – 6H | >80 | >80 | 8.4 | Gt 2 | over 100 | >5 min. |
| 12 | 1:1 | TiO$_2$ Rutile | 30/110 | 93 s | 4H – 5H | >80 | >80 | 8.1 | Gt 0-1 | over 100 | >5 min. |
| 13 | 0.8:1 | TiO$_2$ Rutile | 30/110 | 81 s | 5H – 6H | >80 | 40 | 5.3 | Gt 1 | over 100 | >5 min. |
| 14 | 0.8:1 | TiO$_2$ | 30/110 | 86 s | 5H – 6H | >80 | 50 | 5.8 | Gt 1 | over | >5 min. |

TABLE II-continued

| Examples | PBR | PG | Stoving Schedule min. /° C. | Hardness DIN 53157 | Pencil Hardness | Impact D | Impact R | Indentation DIN 53156 | Crosshatch DIN 53151 | Gloss | Xylol Test |
|---|---|---|---|---|---|---|---|---|---|---|---|
| 15 | 0.8:1 | Rutile TiO$_2$ Rutile | 30/110 | 100 s | 3H – 4H | >80 | >80 | 9.0 | Gt 1 | 100 over 100 | >5 min. |

Key to Tables I and II:

| | |
|---|---|
| PBR | Pigment Binder Ratio |
| PG | Pigment |
| DIN 53157 | Konig Pendulum Hardness (value of Table is the average from 3 separate determinations) |
| Pencil Hardness | Determination is carried out according to the method of Comite Europeen des Associations des Fabricants des Peintures et d'Encres d'Imprimerie (Zeidler-Bleisch, Laboratoriumsbuch fur die Lack- und Anstrichmittelindustrie, Wilhelm Knapp Verlag, 3. Auflage, 1967, page 298) |
| Impact | Gardner impact test apparatus weight - 0.908 kg. ball diameter - 15.8 mm. maximum height - 101.5 cm. = max. 80 ip. D - direct R - reverse |
| DIN.53156 | Erichsen Indentation |
| DIN 53151 | Cross-cut test on paint coatings and similar coatings |
| Gloss | Lange (45°), percent of black normal |
| Xylol Test | Time of exposure to xylol until the film can be damaged with a spatula of 5 mm. width |

It is claimed:

1. Process for producing thermosetting coating compositions from saturated polyesters containing hydroxy groups and aminoplast resins, characterized in that
   A. n mols of one or more compounds having two free or latent hydroxy groups are reacted with
   B. n +1 mols of a dicarboxylic acid which will not form an anhydride, to form a polyester AB carrying terminal carboxy groups,
   C. thereafter each mol of polyester AB is reacted with an amine alcohol of the general formula $$HO - (CX_2)_n - NH_2$$

n being 2 or 3 and X is equal or different and stands for hydrogen, or an alkyl, aryl or hydroxy alkyl radical, the amount of AB to amine being equal to $(e_s - e_p) M_A$ wherein $M_A$ is the molecular weight of the amine alcohol; $e_s$ equals the number of carboxy equivalents in the polyester; and $e_p$ equals the number of hydroxy equivalents in the polyester, and not exceeding 2 mols amine alcohol per mol polyester AB, to provide a polyester containing terminal oxazoline groups,
   D. reacting ABC with an aldehyde in an amount sufficient to introduce sufficient hydroxyl groups at the carbon atoms alpha to the oxazoline group of ABC in order that ABC will undergo reaction with an aminoplast resin, and
   E. combining ABCD with 10 – 60 percent by weight of an aminoplast resin.

2. Process according to claim 1 characterized in that the aldehyde is formaldehyde.

3. Process according to claim 1 characterized in that the average molecular weight of the linear polyester AB ranges between 500 and 10,000.

4. Process according to claim 3 characterized in that the average molecular weight of the polyester AB ranges between 1,000 and 3,000.

5. Process according to claim 1 characterized in that the polyester of AB prior to reaction with C is pre-condensed either in situ or subsequently with hydroxyl compounds carrying more than two free hydroxy groups, said pre-condensate having an intrinsic viscosity of a maximum of 20 ml./g. measured in chloroform at 20° C.

6. Process according to claim 5 characterized in that the polyester is pre-condensed with polyols having three or more hydroxy groups.

7. Process according to claim 5 characterized in that the polyester is pre-condensed with reaction products of polyols and polycarboxylic acids, the reaction products having an average hydroxy functionality of more than 2.

8. Process according to claim 1 characterized in that in the general formula for the amine alcohol C, n is 2 and X is a hydroxymethyl radical.

9. Process according to claim 1 characterized in that in the general formula at least one substituent X is a hydroxyalkyl radical and the reaction product of ABC is reacted with a maximum of 2 moles of aldehyde per mol of amine alcohol.

10. Process according to claim 9 characterized in that the aldehyde is formaldehyde.

11. Process according to claim 1 characterized in that the reaction with the amine alcohol is carried out at 150° – 200° C.

12. Process according to claim 1 characterized in that the acid value of the reaction product of ABC is below 1 mg.KOH/g.

13. Process according to claim 1 characterized in that the reaction with the aldehyde is carried out at 100° – 150° C.

14. Process according to claim 1 characterized in that the combination of the reaction product of ABCD with the aminoplast resin is carried out in the presence of solvents at reflux temperature.

15. Process according to claim 1 characterized in that the combination of the reaction product of ABCD with the aminoplast resin is carried out in the presence of an acid catalyst.

16. Process according to claim 16 characterzied in that the acid catalyst is p-toluol sulfonic acid.

17. Process according to claim 1 characterized in that the products are rendered water soluble through reaction with inorganic or organic acids, in the presence of water tolerant solvents.

18. Process according to claim 17 characterized in that the acid is a hydroxy carboxylic acid.

19. Process according to claim 18 characterized in that the hydroxy carboxylic acid is lactic acid.

20. Process according to claim 17 characterized in that the acid is phosphoric acid.

21. The thermosetting coating composition made by the process of claim 1.

22. Thermosetting coating composition comprising the reaction product of
   A. a polyester which is the reaction product of
      a. n mols of one or more compounds having two free or latent hydroxy groups, and b. n + 1 mols of a dicarboxylic acid which will not form an anhydride, to form a polyester A carrying terminal carboxy groups, B. an amine alcohol of the general formula $$HO - (CX_2)_n - NH_2$$

n being 2 or 3 and X is equal or different and stands for hydrogen,
or an alkyl, aryl or hydroxy alkyl radical, the amount of AB to amine being equal to $(e_s - e_p) M_A$ wherein $M_A$ is the molecular weight of the amine alcohol; $e_s$ equals the number of carboxy equivalents in the polyester; and $e_p$ equals the number of hydroxy equivalents in the polyester, and not exceeding 2 mols amine alcohol per mol polyester AB, to provide a polyester containing terminal oxazoline groups, C. AB is reacted with an aldehyde in an amount sufficient to introduce sufficient hydroxyl groups at the carbon atom alpha to the oxazoline group of ABC in order that ABC will undergo reaction with an aminoplast resin, and D. 10 – 60 percent by weight of an aminoplast resin.

23. Coating composition of claim 22 wherein the aldehyde is formaldehyde.

24. Coating composition of claim 22 wherein the average molecular weight of the polyester A ranges between 500 and 10,000.

25. Coating composition of claim 24 wherein the average molecular weight of the polyester A ranges between 1,000 and 3,000.

26. Coating composition of claim 22 wherein the polyester of A prior to reaction with B is pre-condensed either in situ or subsequently with hydroxyl compounds carrying more than two free hydroxy groups, said pre-condensate having an intrinsic viscosity of a maximum of 20 ml./g. measured in chloroform at 20° C.

27. Coating composition of claim 22 wherein in the general formula for the amine alcohol of B, n is 2 and X is a hydroxymethyl radical.

28. Coating composition of claim 22 wherein in the general formula of B at least one substituent X is a hydroxyalkyl radical and the reaction product of AB is reacted with a maximum of 2 mols of aldehyde per mol or amine alcohol.

29. Coating composition of claim 28 wherein the aldehyde is formaldehyde.

30. Coating composition of claim 22 to which sufficient inorganic or orgaic acid is added to render the composition water soluble.

31. Coating composition of claim 30 wherein the acid is a hydroxy carboxylic acid.

32. Coating composition of claim 30 wherein the acid is phosphoric acid.

33. Process according to claim 1 wherein reactions D and E are proceeding simultaneously.

34. Process according to claim 1 wherein reaction D is complete followed by reaction E.

* * * * *